(12) United States Patent
Van Waardhuizen et al.

(10) Patent No.: US 12,297,941 B2
(45) Date of Patent: May 13, 2025

(54) LOW-PRESSURE TUBULAR SYSTEM COMPRISING EXPANSION JOINTS

(71) Applicant: TRELLEBORG RIDDERKERK B.V., Ridderkerk (NL)

(72) Inventors: Dirk Jan Dingeman Van Waardhuizen, Ridderkerk (NL); Simon Wolfert, Ridderkerk (NL)

(73) Assignee: TRELLEBORG RIDDERKERK B.V., Ridderkerk (NL)

( * ) Notice: Subject to any disclaimer, the term of this patent is extended or adjusted under 35 U.S.C. 154(b) by 0 days.

(21) Appl. No.: 17/785,472

(22) PCT Filed: Jan. 7, 2021

(86) PCT No.: PCT/EP2021/050177
§ 371 (c)(1),
(2) Date: Jun. 15, 2022

(87) PCT Pub. No.: WO2021/144186
PCT Pub. Date: Jul. 22, 2021

(65) Prior Publication Data
US 2023/0013400 A1      Jan. 19, 2023

(30) Foreign Application Priority Data
Jan. 14, 2020   (NL) ..................................... 2024669

(51) Int. Cl.
*F16L 27/12*      (2006.01)
*F16L 27/107*    (2006.01)
(Continued)

(52) U.S. Cl.
CPC ............. *F16L 27/12* (2013.01); *F16L 27/107* (2013.01); *F16L 27/108* (2013.01);
(Continued)

(58) Field of Classification Search
CPC ... F16L 27/107; F16L 27/108; F16L 27/1085; F16L 51/024; F16L 51/022
See application file for complete search history.

(56) References Cited

U.S. PATENT DOCUMENTS 2,738,993 A      3/1956   Wilson
3,516,694 A  *  6/1970   Schwartz .............. F16L 21/005
                                                        285/236
(Continued)

FOREIGN PATENT DOCUMENTS

DE       1158776 B  * 12/1963  .......... F16L 27/1085
DE       1750924 A1    4/1971
(Continued)

OTHER PUBLICATIONS

"Hancock Thomas", "Flexible coupling device for the assembly of tubes", Translation of FR-394768 (Year: 1909).*
(Continued)

*Primary Examiner* — Zachary T Dragicevich
*Assistant Examiner* — Alexander T Rufrano
(74) *Attorney, Agent, or Firm* — KDW Firm PLLC

(57) ABSTRACT

A low-pressure tubular system includes a multitude of interconnected tube sections having a longitudinal axis. Each of the tube sections includes a central part and two outer end parts. The tubular system is configured to maintain a low-pressure environment within the connected tube sections. The system further includes a multitude of expansion joints connecting the tube sections. Each of the expansion joints includes a sleeve made of a flexible sheet material and includes a ring shaped endless central part and two ring shaped endless outer end parts. Each of the outer end parts of the expansion joints are arranged to extend coaxial with an adjacent tube section and surround and sealingly engage the outer end part of said adjacent tube section.

11 Claims, 2 Drawing Sheets

(51) Int. Cl.
*F16L 27/108* (2006.01)
*F16L 51/02* (2006.01)

(52) U.S. Cl.
CPC ......... *F16L 27/1085* (2013.01); *F16L 51/022* (2013.01); *F16L 51/024* (2013.01)

(56) References Cited

U.S. PATENT DOCUMENTS

| | | | | |
|---|---|---|---|---|
| 3,861,721 | A * | 1/1975 | Berghofer | F16L 21/002 |
| | | | | 285/236 |
| 4,059,293 | A * | 11/1977 | Sipler | F16L 27/11 |
| | | | | 285/236 |
| 4,186,949 | A * | 2/1980 | Bartha | F16L 27/108 |
| | | | | 285/229 |
| 4,191,217 | A * | 3/1980 | Kadono | F16L 33/23 |
| | | | | 138/109 |
| 4,220,180 | A * | 9/1980 | Koga | F16L 33/28 |
| | | | | 138/155 |
| 4,403,796 | A * | 9/1983 | Ledbetter | F16L 51/021 |
| | | | | 138/125 |
| 4,732,413 | A * | 3/1988 | Bachmann | F16L 27/108 |
| | | | | 285/236 |
| 6,945,567 | B2 * | 9/2005 | Fleck | F16L 51/024 |
| | | | | 285/229 |
| 8,905,440 | B2 * | 12/2014 | Hagiya | F16L 27/1017 |
| | | | | 285/293.1 |
| 2011/0146049 | A1 | 6/2011 | Hagiya | |
| 2017/0254456 | A1 | 9/2017 | Pearse et al. | |

FOREIGN PATENT DOCUMENTS

| | | | |
|---|---|---|---|
| FR | 394768 A * | 2/1909 | |
| FR | 2906343 A1 | 3/2008 | |
| JP | 2002005344 A * | 1/2002 | |
| JP | 2009127727 A * | 6/2009 | ............ F16L 27/111 |
| KR | 101853924 B1 | 5/2018 | |
| WO | 2016126506 A1 | 8/2016 | |
| WO | WO-2022089966 A1 * | 5/2022 | |

OTHER PUBLICATIONS

WO2009066478A1 Description Translation (Year: 2009).*
JP2002005344 Description Translation (Year: 2002).*
International Search Report and Written Opinion for PCT/EP2021/050177, dated Apr. 6, 2021 (15 pages).

* cited by examiner

LOW-PRESSURE TUBULAR SYSTEM COMPRISING EXPANSION JOINTS

This application is a national stage filing under 35 U.S.C. 371 of pending International Application No. PCT/EP2021/050177, filed Jan. 7, 2021, which claims priority to Netherlands Patent Application No. 2024669, filed Jan. 14, 2020, the entirety of which applications are incorporated by reference herein.

BACKGROUND OF THE DISCLOSURE

The invention relates to a low-pressure tubular system, for instance a vacuum tube train transportation system such as a Hyperloop, comprising a multitude of interconnected tube sections having a longitudinal axis, wherein each of the tube sections comprise a central part and two outer end parts, and wherein the tubular system is configured to maintain a low-pressure, or near vacuum, environment within the connected tube sections. Such systems are for instance disclosed in the international patent application publications Nos. WO 2017/155980 A1 and WO 2016/126505 A1, which are incorporated herein by reference.

In such systems, trains or other vehicles may travel with high speed through near-vacuum tube sections, while the tube sections are subject to movements which may be caused by thermal expansion of the ground and/or the tubes themselves, or other by causes such as structural movements, settlement, dynamic loading, etc. A flexible airtight joint between the tube sections is therefore required, which is safe and robust, and which must for instance be able to withstand high forces caused by the vacuum inside the tube sections, and/or which must be able to withstand possible external impacts to a certain extent caused by for instance humans.

SUMMARY OF THE DISCLOSURE

According to an embodiment the system therefore further comprises a multitude of expansion joints connecting the tube sections; wherein each of the expansion joints comprises a sleeve made of a flexible sheet material and comprising a ring shaped endless central part and two ring shaped endless outer end parts; wherein each of the outer end parts of the expansion joints are arranged to extend coaxial with an adjacent tube section and surround and sealingly engage the outer end part of said adjacent tube section. Ring shaped in this respect must be understood to include any closed circumferential shape, such as circular, rectangular or polygonal shapes.

According to a further embodiment each of the outer end parts of the expansion joints is provided with a ring shaped endless retainer cable which is fixed to the flexible sheet material and which extends coaxial with the adjacent tube section; wherein each of the outer end parts of the tube sections is provided with a ring shaped radially outwardly extending flange near the outer end of the tube section, said flange having a radial outer surface, an axial inward surface which extends at the side of the central part of the respective tube section, and an axial outward surface which extends at the outer end side of the respective tube section; wherein the radial outer surface of said flange is engaged by the radial inner surface of the respective outer end part of the expansion joint; wherein the inner diameter of each of the ring shaped endless retainer cables is designed such that the respective outer end of the expansion joint exerts a force against the axial inward surface of the flange. Preferably the inner diameter of each of the ring shaped endless retainer cables is less than the outer diameter of the respective flange. Preferably the retainer cable is made of steel, glass-fiber reinforced plastic or aramid.

According to a further embodiment the central parts of the sleeves of the expansion joints each have a substantially V-shaped or U-shaped cross section, seen in tangential direction, such that the central part has a centre portion have a substantially smaller diameter than the two outer end parts.

According to a further embodiment the flexible sheet material of at least the central part of the sleeves of the expansion joints each have at least two separate layers, consisting of: a first layer of a flexible material that is air impermeable; a second layer of a flexible material that has a higher tensile strength in the axial direction of the tubular system than the first layer. Preferably the flexible sheet material of at least the central part of the sleeves of the expansion joints each further have a third layer of a flexible material that has a higher cut resistance and/or a higher puncture resistance against impact of sharp objects from the outside than the first layer and the second layer, wherein the third layer surrounds the first layer. Preferably the third layer surrounds the second layer. Preferably the second layer surrounds the first layer. Preferably the second layer is comprised of at least two overlapping sublayers of the same material. Preferably the material of the first layer is a rubber, preferably SBR, EPDM, NR or CR rubber. Preferably the material of the second layer comprises aramid, carbon, nylon and/or polyester fibres. Preferably the material of the third layer comprises aramid fibres, glass fibres, steel mesh or steel fibres. Preferably tensile strength is measured by the ASTM D7003 standard method, wherein cut resistance is measured by the ASTM F1790 standard method, and/or wherein puncture resistance is measured by the ASTM D4833 standard method.

The tube sections may be made of concrete or a metal, such as steel, and the tube sections may have diameter of at least 2.5 m.

BRIEF DESCRIPTION OF THE DRAWINGS

The invention will now be further illustrated by means of a preferred embodiment, as shown in the drawings, wherein.

DETAILED DESCRIPTION

Figure 1:
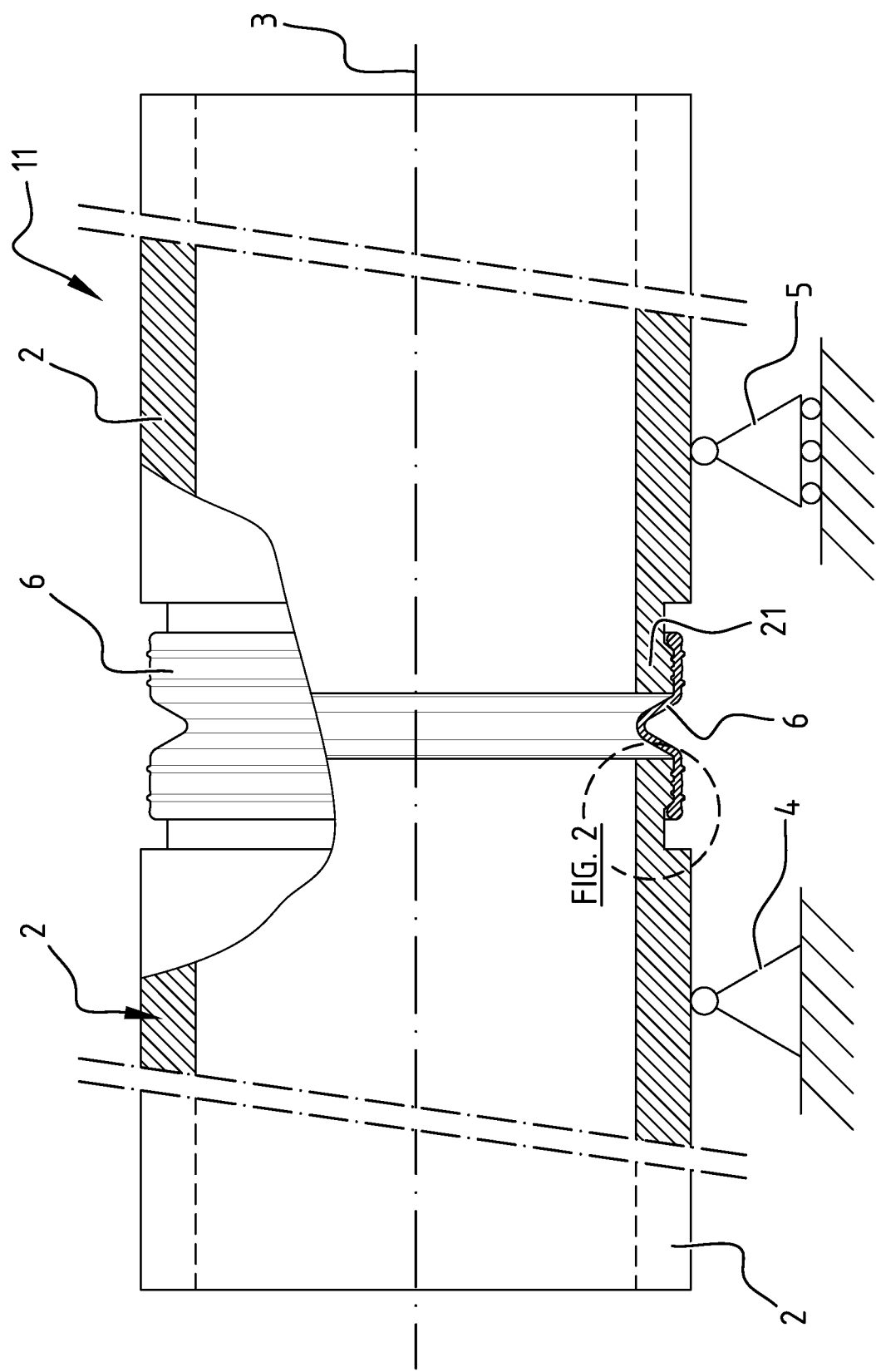
FIG. 1 is a side view, partially seen in longitudinal cross section, of a system in accordance with the invention.

With reference to FIG. 1, a (near) vacuum tube train transportation system 1 such as a Hyperloop comprises a multitude of interconnected tube sections 2 having a longitudinal axis 3. The tube section 2 may for instance be made of steel or concrete, and may have an inner diameter that allows a Hyperloop passenger train (not shown) to be driven through the system 1.

As indicated by the schematic mounting symbols 4, 5 the tube sections may be mounted such that at one outer end (at mounting symbol 4) it is fixed to the ground, but allowed to rotate, and at its other outer end a guided support (mounting symbol 5) allows the tube section 2 to translate and rotate relative to the ground. Thereby thermal expansion of the tube sections 2 and (small) ground movements can be accommodated by the system.

Figure 2:
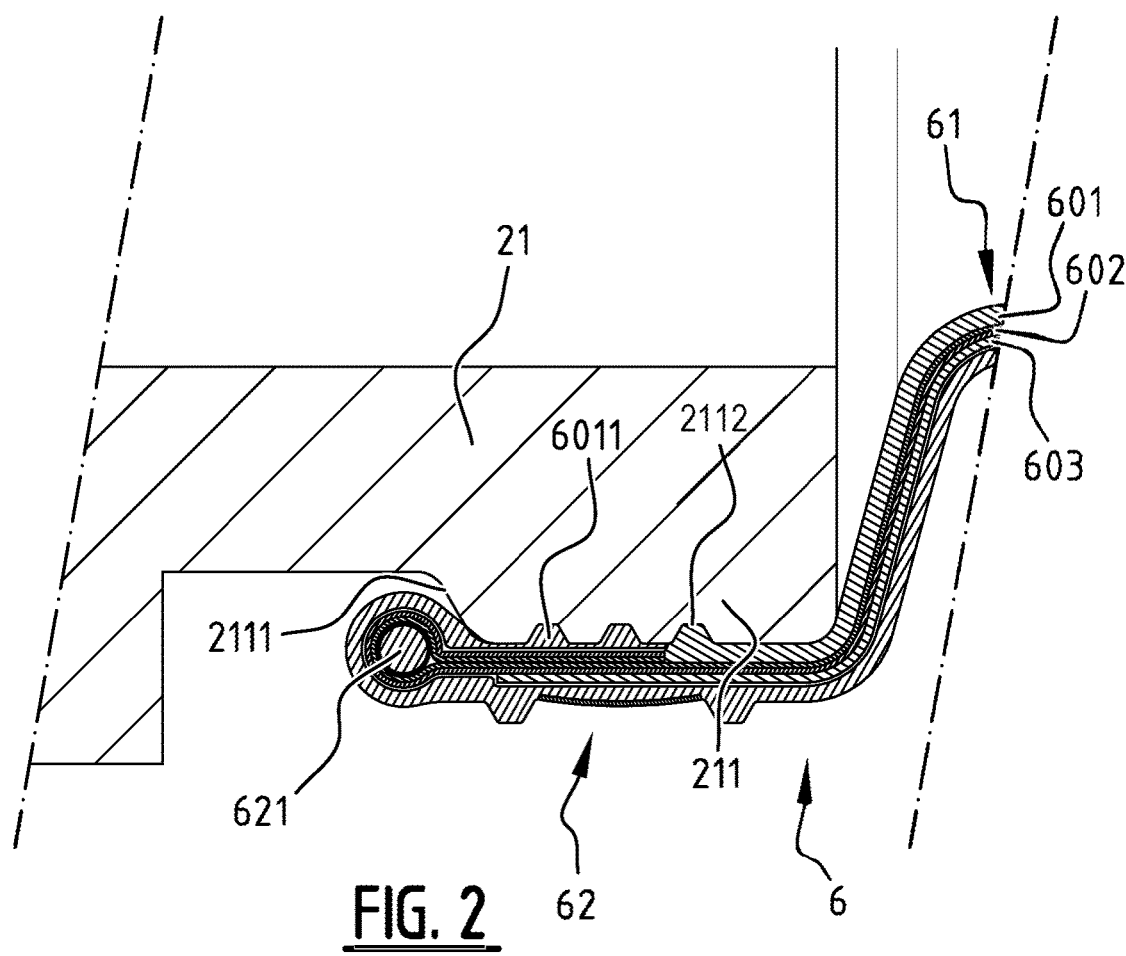
FIG. 2 is a detail of the system as indicated in FIG. 1.
Figure 3:
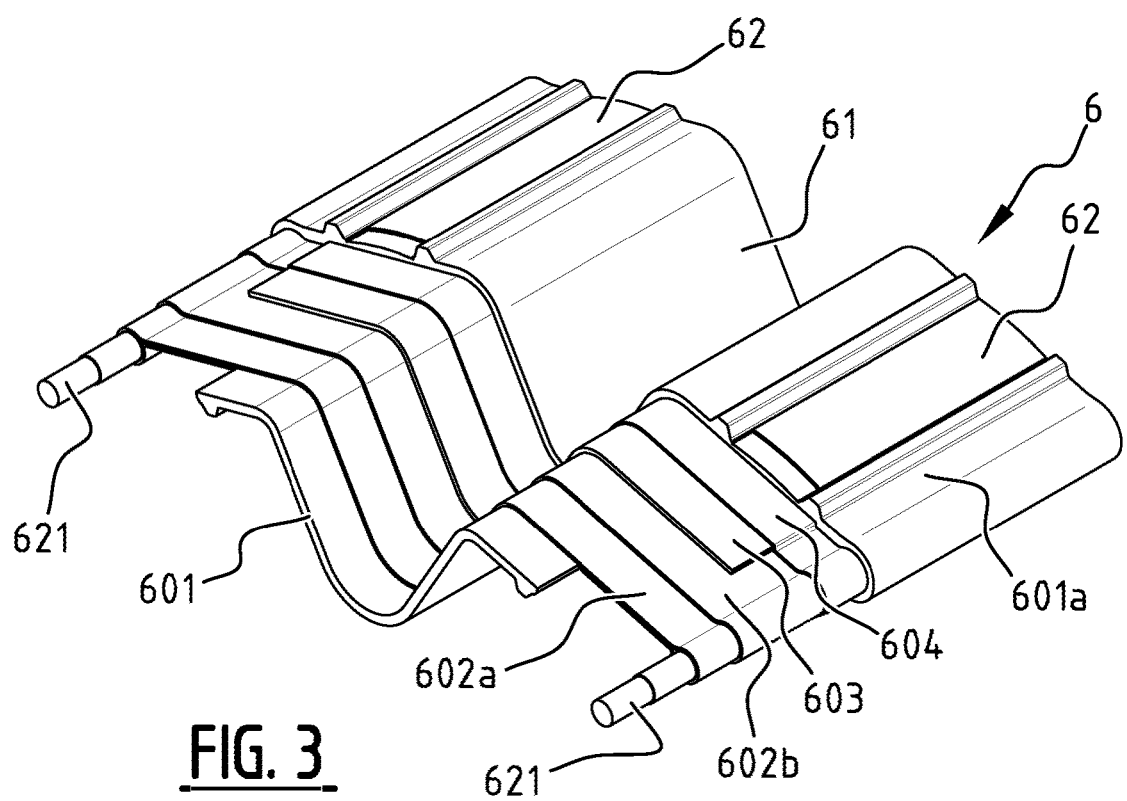
FIG. 3 is a perspective view of a cross section of the expansion joint used in the system of the invention.

With reference to FIGS. 1, 2 and 3, expansion and movement of the ends of the tube sections 2 require that the outer end parts 21 of the tube sections 2 are mutually connected by flexible expansion joints 6. The expansion joints 6 are comprised of a sleeve of flexible sheet material with a central part 61 and outer end parts 62. The outer end parts 62 of the expansion joints 6 extend coaxial with the axis 3 of the adjacent tube section 2 and sealingly engage the outer end parts 21.

The outer end parts 62 of the expansion joints 6 are provided with a ring shaped endless retainer cable 621 made of steel which may or may not be fixed to the flexible sheet material and which extends coaxial with the axis 3 of the adjacent tube section 2. The outer end parts 21 of the tube sections 2 are provided with a flange 211, and the radial outer surface of the flange 211 is engaged by the radial inner surface of the outer end part 62 of the expansion joint 6. The inner diameter of each of the ring shaped endless retainer cable 621 is less than the outer diameter of the flange 211, such that the material of the outer end of the expansion joint 6 that surrounds the retainer cable 621 exerts a force against the axial inward surface 2111 of the flange 211, thereby preventing the expansion joint 6 to slide of the outer end part 21 of the tube section 2. The outer end parts 21, and its flanges 211, of the tube sections 2 have a smaller outer diameter than the central parts of the tube sections 2, such that the outer diameter of the outer end parts 62 of the joints 6, which surround the outer end parts 21, is still smaller than (or approximately equal to) the outer diameter of the tube sections 2. The joint 6 may, however, be positioned on the outside face of the tube sections 2 as well, rendering the joint 6 larger than the outer diameter of tube sections 2.

The flexible and movable central parts 61 of the expansion joints 6, which are subjected to the force caused by the difference in pressure between the environment of the tube system and the low pressure or (near) vacuum inside the tube sections 2, have a substantially V-shaped or U-shaped cross section. Thereby the centre part of central part 61 have a substantially smaller diameter than the two outer end parts. As shown in FIG. 2, the inner diameter of the centre part of the central part 61 may be about the same as, or even smaller than, the inner diameter of the tube sections 2, but preferably the expansion joint 6 does not interfere with the inner envelope of the tube.

As shown in FIGS. 2 and 3, the flexible sheet material of the expansion joints 6 comprise several separate layers. The first layer 601 is made of a flexible rubber material, such as SBR, NR or CR (EPDM and NBR or other general elastomers), that is air impermeable. At the outer end parts 62 the first layer 601 is provided with radially inward ribs 6011 which may be fully compressed against the flange surface, thereby providing extra sealing against possible air leaking into the tube system 1 from the environment. Alternatively, the flanges 211 may be provided with matching grooves 2112, as shown, which are engaged and filled by the ribs 6011.

The reinforcing second layer 602 is comprised of at least two overlapping sublayers 602a, 602b, which are each made of a flexible material, such as a woven cloth fabric of aramid, carbon, nylon and/or polyester fibers that have a higher tensile strength in the axial direction of the tubular system than the first layer 601.

A protective third layer 603 of a flexible material, such as a woven cloth fabric of aramid fibres, surrounds the first layer 601 and the second layer 602 in at least the central part 61 of the expansion joint 6, and has a higher cut resistance and a higher puncture resistance against impact of sharp objects (such as knives) from the outside than the first layer 601 and the second layer 602.

The outer ends of the second layer 602 are wrapped around the cables 621, such that the cables 621 retain said outer ends, and thereby the entire sleeve, firmly against the flanges 211 of the tube sections 2.

A further rubber layer 601a, which is continuous with the first layer 601, surrounds the previous layers 602, 603, such that these layers 602, 603 and the cable 621 are enclosed in rubber and sealed from the environment. The outer rubber layer 601a may be vulcanized/adhered to the third layer 603 by an intermediate layer 604.

The invention has thus been described by means of a preferred embodiment. It is to be understood, however, that this disclosure is merely illustrative. Various details of the structure and function were presented, but changes made therein, to the full extent extended by the general meaning of the terms in which the appended claims are expressed, are understood to be within the principle of the present invention. The description and drawings shall be used to interpret the claims. The claims should not be interpreted as meaning that the extent of the protection sought is to be understood as that defined by the strict, literal meaning of the wording used in the claims, the description and drawings being employed only for the purpose of resolving an ambiguity found in the claims. For the purpose of determining the extent of protection sought by the claims, due account shall be taken of any element which is equivalent to an element specified therein. An element is to be considered equivalent to an element specified in the claims at least if said element performs substantially the same function in substantially the same way to yield substantially the same result as the element specified in the claims.

The invention claimed is:

1. A low-pressure tubular system, comprising:
a multitude of interconnected tube sections having a longitudinal axis;
wherein each of the tube sections comprise a central part and two outer end parts;
wherein the tubular system is configured to maintain a low-pressure environment within the connected tube sections;
wherein the system further comprises a multitude of expansion joints connecting the tube sections;
wherein each of the expansion joints comprises a sleeve made of a flexible sheet material and comprises a ring shaped endless central part and two ring shaped endless outer end parts;
wherein the flexible sheet material of at least the central part of the sleeves of the expansion joints each include multiple separate layers, comprising:
a first layer of a flexible material that is air impermeable;
a second layer of a flexible material that has a higher tensile strength in the axial direction of the tubular system than the first layer; and
a third layer of a flexible material that has a higher cut resistance and/or a higher puncture resistance against impact of sharp objects from the outside than the first layer and the second layer; and
wherein the first layer surrounds and encapsulates the second and third layers,
wherein each of the ring shaped endless outer end parts includes a ring shaped retainer cable that extends coaxial with the adjacent tube section, and wherein the first and second layers surround and encapsulate the retainer cables, wherein the outer end parts of each of the tube sections include a flange, and a radial outer surface of each said flange is engaged by a radial inner surface of the ring shaped endless outer end parts of the expansion joint, and wherein the first layer includes a plurality of radially inwardly projecting ribs that engage matching grooves in the radial outer surface of each said flange, and wherein each of the outer end parts of the expansion joints are arranged to extend coaxial with an adjacent tube section and surround and sealingly engage the outer end part of said adjacent tube section.

2. The system in accordance with claim 1, wherein the flange of each of the outer end parts of the tube sections comprises a ring shaped radially outwardly extending flange, said flange having an axial inward surface which extends at a side of the central part of the respective tube section, and an axial outward surface which extends at an outer end side of the respective tube section; and wherein the inner diameter of each of the ring shaped endless retainer cables is configured such that the respective outer end of the expansion joint exerts a force against the axial inward surface of the flange.

3. The system in accordance with claim 2, wherein the inner diameter of each of the ring shaped endless retainer cables is less than the outer diameter of the respective flange.

4. The system in accordance with claim 2, wherein the retainer cable is made of steel, glass-fibre reinforced plastic or aramid.

5. The system in accordance with claim 1, wherein the central parts of the sleeves of the expansion joints each have a substantially V-shaped or U-shaped cross section, seen in tangential direction, such that the central part has a centre portion have a substantially smaller diameter than the two outer end parts of the expansion joints.

6. The system in accordance with claim 1, wherein the second layer is comprised of at least two overlapping sublayers of the same material.

7. The system in accordance with claim 1, wherein the material of the first layer is a rubber.

8. The system in accordance with claim 1, wherein the material of the second layer comprises aramid, carbon, nylon and/or polyester fibres.

9. The system in accordance with claim 1, wherein the material of the third layer comprises aramid fibres, glass fibres, steel mesh or steel fibres.

10. The system in accordance with claim 1, wherein the tube sections are made of concrete or metal.

11. The low-pressure tubular system of claim 1, further comprising a fourth layer disposed between the first layer and the third layer, wherein the first layer is vulcanized or adhered to the third layer via the fourth layer.

* * * * *